United States Patent
Sasaki

(10) Patent No.: US 6,876,360 B2
(45) Date of Patent: Apr. 5, 2005

(54) IMAGE GENERATION METHOD AND DEVICE USED THEREOF

(75) Inventor: Nobuo Sasaki, Kanagawa (JP)

(73) Assignee: Sony Corporation Entertainment Inc. (JP)

( * ) Notice: Subject to any disclaimer, the term of this patent is extended or adjusted under 35 U.S.C. 154(b) by 216 days.

(21) Appl. No.: 10/062,978

(22) Filed: Jan. 31, 2002

(65) Prior Publication Data

US 2002/0122036 A1 Sep. 5, 2002

(30) Foreign Application Priority Data

Feb. 1, 2001 (JP) .................................. P2001-025376
Aug. 24, 2001 (JP) .................................. P2001-254576

(51) Int. Cl.[7] .............................................. G06T 15/40
(52) U.S. Cl. ..................... 345/422; 345/421; 345/592
(58) Field of Search ......................... 345/419, 421–422, 345/589, 592

(56) References Cited

U.S. PATENT DOCUMENTS

| | | | | |
|---|---|---|---|---|
| 4,730,261 A | * | 3/1988 | Smith | 345/422 |
| 5,471,567 A | * | 11/1995 | Soderberg et al. | 345/615 |
| 5,923,333 A | | 7/1999 | Stroyan | |
| 6,411,294 B1 | * | 6/2002 | Furuhashi et al. | 345/421 |
| 6,456,285 B2 | * | 9/2002 | Hayhurst | 345/422 |
| 6,636,214 B1 | * | 10/2003 | Leather et al. | 345/422 |
| 6,670,955 B1 | * | 12/2003 | Morein | 345/421 |

FOREIGN PATENT DOCUMENTS

| | | |
|---|---|---|
| GB | 2350993 A | 12/2000 |
| JP | 9330422 A | 12/1997 |
| JP | 10-011610 A | 1/1998 |
| JP | 10-208076 A | 8/1998 |
| JP | 11-283047 A | 10/1999 |
| JP | 2000-182073 A | 6/2000 |
| JP | 2000-268190 A | 9/2000 |
| JP | 2002-298152 A | 10/2002 |

* cited by examiner

Primary Examiner—Matthew C. Bella
Assistant Examiner—Po-Wei Chen
(74) Attorney, Agent, or Firm—Lerner, David, Littenberg, Krumholz & Mentlik, LLP

(57) ABSTRACT

The present invention ensures that object images to be subjected to a predetermined image processing are subjected to such image processing depending on predetermined coefficients of semi-transparency, and that a portion of the object images closest to a virtual viewpoint is processed last. This successfully provides an image based on a first image processing ($\alpha$-blending, for example) depending on coefficients of semi-transparency in a natural and unfailing manner without using a technique such as Z sorting.

19 Claims, 7 Drawing Sheets

IMAGE GENERATION METHOD AND DEVICE USED THEREOF

CROSS-REFERENCE TO RELATED APPLICATIONS

The present application claims priority from Japanese Patent Application Nos. 2001-25376 filed on Feb. 1, 2001, and 2001-254576 filed on Aug. 24, 2001, the disclosures of which are hereby incorporated by reference herein.

BACKGROUND OF THE INVENTION

The present invention relates to an image generation method and a device used therefor for generating three-dimensional images to be drawn on a two-dimensional screen, such as on a television monitor; an image processing program for making a computer execute image generation processing; and a recording medium having recorded thereon such image processing program.

There are accelerating trends in higher integration and faster processing speeds of processors and memories in recent television game machines and personal computers which enable real-time generation of three-dimensional images with real presence and perspective in the display thereof on two-dimensional monitor screens.

When a three-dimensional image is drawn on a two-dimensional monitor screen, the three-dimensional polygon data are subjected to various geometric processing, such as coordinate conversion, clipping and lighting, and the resultant data are further subjected to translucent projection conversion.

In the conventional image generation device for generating a three-dimensional image to be displayed on a two-dimensional monitor screen, drawing of a semi-transparent object or drawing based on pixel occupational factors for anti-aliasing of the edge portion of an object generally requires so-called α-blending, which is a technique of generating a drawn image based on linear interpolation between pixel values on a frame buffer and drawn pixel values using a coefficient α for expressing semi-transparency (or transparency).

It has, however, been known for such technique of generating a drawn image based on α-blending that an image will look unnatural unless the objects are drawn in a manner such that the further the object is in the depth direction of the screen (direction of the depth from the viewpoint, referred to as Z direction hereinafter), the earlier it should be drawn. There is also known a technique for drawing objects according to their depth in the Z direction, such as a Z buffer method which can provide correct depth relation among the individual planes by finding out the closest planes for the individual pixels and expressing each pixel with a color of such closest plane. This is unlike the Z sorting method whereby the individual planes are painted with respective colors. With the Z buffer method, however, the foregoing problem remains unsolved.

SUMMARY OF THE INVENTION

The present invention was proposed to address the foregoing problem, and an object thereof resides in providing an image generation method and a device used therefor, an image processing program for making a computer execute image generation processing, and a recording medium having recorded thereon such image processing program, all of which being aimed at successfully providing an image based on α-blending in a natural and unfailing manner without using a technique such as Z sorting.

The present invention ensures that object images to be subjected to a predetermined image processing are subjected to such image processing depending on predetermined coefficients of semi-transparency, and that a portion of the object images closest to a virtual viewpoint is processed last.

That is, the present invention is successful in providing an image based on a first image processing (α-blending, for example) depending on coefficients of semi-transparency in a natural and unfailing manner without using a technique such as Z sorting, by always allowing the portion of the object images closest to the virtual viewpoint to be processed later than any other object images to be subjected to the predetermined image processing depending on the coefficients of semi-transparency.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the invention in practice.

DETAILED DESCRIPTION

Figure 1:
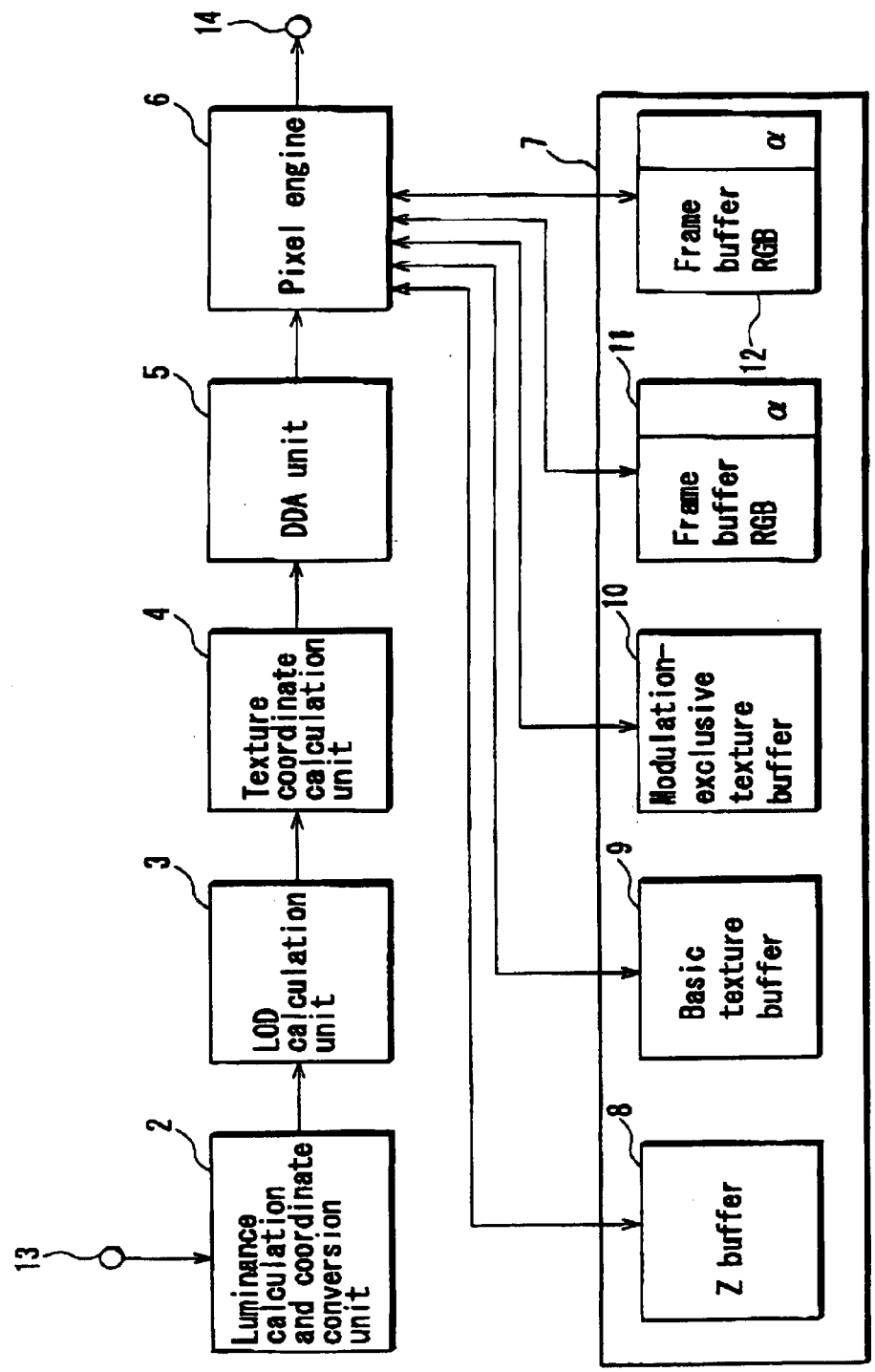
FIG. 1 is a block diagram explaining a principal portion of an image generation device according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

A Configuration of an Image Generation Device of the Embodiment

FIG. 1 shows a schematic configuration of an image generation device 1 of the embodiment of the present invention. The image generation device 1 of the embodiment is a device for generating a two-dimensional image based on texture mapping onto three-dimensional polygons, and is applicable to video game machines, personal computers and three-dimensional graphic devices.

The image generation device 1 shown in FIG. 1 mainly includes a luminance calculation and coordinate conversion unit 2, an LOD (level of detail) calculation unit 3, a texture coordinate calculation unit 4, a DDA (digital differential analyzer) unit 5, a pixel engine 6 and an image memory 7.

The image memory 7 further includes a Z buffer 8 for storing values in the depth-wise direction from a viewpoint (Z coordinate values), a basic texture buffer 9 for storing basic texture data for generating overall patterns on the polygons based on mapping, a modulation-exclusive texture buffer 10 for storing texture data used for amplitude modulation of the pattern generated by the mapping of the basic texture, and two frame buffers 11, 12 for storing and synthesizing frame data (two-dimensional image data) displayed on a two-dimensional monitor screen as described later.

It is also allowable to store data for the basic texture and the modulation-exclusive texture into the frame buffer. One possible way is to store data for the basic texture into an RGB storage area in the frame buffer and data for the modulation-exclusive texture into an α storage area of such frame buffer. With such strategy, it is no longer necessary for the image memory 7 to have storage areas such as the basic texture buffer 9 and the modulation-exclusive texture buffer 10.

Typically input through an input terminal 13 of the image generation device 1 provided with such components are three-dimensional polygon information, a coefficient α for expressing semi-transparency used for α-blending, texture information, light source information and viewpoint information. This various information typically is supplied through a communication line or a storage device.

The three-dimensional polygon information typically includes information such as (x, y, z) coordinates of the individual apexes of the triangular polygons and normal lines at such apexes; and the texture information includes information for the individual texels having values of R (red), G (green) and B (blue), which are the three primary colors of light, and texture coordinate information corresponding to the individual apexes of the triangular polygons. The coefficient α expressing semi-transparency is the one used for α-blending which defines a ratio of image blending in texture mapping, and is specifically set at values "A" ("A" represents α) corresponding to the values of R, G and B. The viewpoint information and the light source information are used for luminance calculation and coordinate conversion for the polygons. The light source information may represent not only a single light source but also a plurality of light sources. The individual apex information of the polygons can also include, besides the information described above, various information such as color information or fog values for providing an effect of fogging for distant objects.

The various information is first entered into the luminance calculation and coordinate conversion unit 2 of the image generation device 1. The luminance calculation and coordinate conversion unit 2 converts the input individual coordinate information of the polygons into coordinate values in a coordinate system for the two-dimensional drawing based on the viewpoint information, and calculates the luminance at the individual apexes of the polygons based on the viewpoint information and the light source information. In addition to the foregoing calculations, the luminance calculation and coordinate conversion unit 2 is also responsible for other processing, such as translucent conversion. The individual values calculated in the luminance calculation and coordinate conversion unit 2 are input to the LOD calculation unit 3.

The LOD calculation unit 3 calculates, based on Z coordinate values of such converted polygons, LOD values which are used when the pixel engine 6 reads out basic textures from the basic texture buffer 9. Here the LOD value can be calculated from a shrinkage factor when a polygon is shrunk, where such shrinkage factor is typically obtained as a logarithmic value of the distance from the viewpoint to the polygon. The LOD value is sent via the texture coordinate calculation unit 4 and the DDA unit 5 to the pixel engine 6.

The texture coordinate calculation unit 4 calculates, from texture coordinate values for the basic texture, texture coordinate values which are used when the pixel engine 6 reads out modulation-exclusive texture coordinates from the modulation-exclusive texture buffer 10. These texture coordinate values are sent via the DDA unit 5 to the pixel engine 6.

The DDA unit 5 converts the two-dimensional polygon apex information, Z coordinate values, luminance information and so forth into pixel information. More specifically, the DDA unit 5 determines, by linear interpolation, the coordinate values, Z values, luminance values and texture coordinate values for the individual pixels. Output of such DDA unit 5 is sent to the pixel engine 6.

The pixel engine 6 not only controls read-out and write-in operations to or from the Z buffer 8, the basic texture buffer 9, the modulation-exclusive texture buffer 10 and the individual frame data storage areas of the first and second frame buffers 11, 12, but is also responsible for texture mapping using both the texel information read out from the basic texture buffer 9 or the modulation-exclusive texture buffer 10, and the pixel information determined by the DDA unit 5, comparison of the Z coordinate values, calculation of the pixel values and write-in operation of the pixel values.

In such texture mapping, the pixel engine 6 performs the texture mapping onto the three-dimensional polygons based on a so-called MIP mapping system using the basic textures stored in the basic texture buffer 9. The MIP mapping system refers to a system in which textures of various scales, such as ½, ¼, ⅛ scales and so on (numerals represent the ratios of lengths of the individual sides), are previously registered, and a proper one of which is selected depending on a shrinkage factor to be mapped onto a three-dimensional polygon. According to such MIP mapping system, textures shrunk from the original texture are mapped onto the polygons, which successfully prevents aliasing likely to occur when the polygons are shrunk. For cases in which the basic texture is added with still higher frequency components in such texture mapping, the pixel engine 6 performs texture mapping using the modulation-exclusive texture stored in the modulation-exclusive texture buffer 10.

The pixel engine 6 is also responsible for α-blending, scissoring, Z test, dithering, color clamping and so forth. Scissoring refers to a process for removing data which overflows the screen. The Z test refers to a process for comparing Z values of the individual pixels and Z values stored in the Z buffer 8, and drawing only pixels closer to the viewpoint while omitting distant pixels. Dithering refers to a process for staggering color pixel arrangement so as to express a large number of apparent colors with a small number of color pixels. Color clamping refers to a process for limiting calculated color values so as not to exceed 255 or become lower than 0.

The pixel engine 6 stores the image data obtained from such various processes into the first and second frame buffers 11, 12 as described later, and synthesizes frame data (two-dimensional image data) to be displayed on the two-dimensional monitor screen. Such synthesized two-dimensional image data are then read out from the first or second frame buffers 11, 12, and output through an output terminal 14 to the two-dimensional monitor device.

Details of Image Synthesis

The synthetic processing of the image data to be drawn on the two-dimensional monitor screen using the first and second frame buffers 11, 12, conducted by the pixel engine 6, will be explained with reference to FIGS. 2 to 6.

The image generation device 1 of the present embodiment has the first and second frame buffers 11, 12 (two frame data storage areas) within the image memory 7, and repeats a predetermined image drawing process two or three times while controlling ON/OFF of the α-blending as a predetermined image process, Z test as a predetermined comparative process, and a Z value write-in operation as a saving of distance information as described later, and the obtained images are synthesized based on ON/OFF control of the α-blending and Z test to thereby ensure an unfailing α-blended drawing without relying upon the Z sorting.

Figure 2:
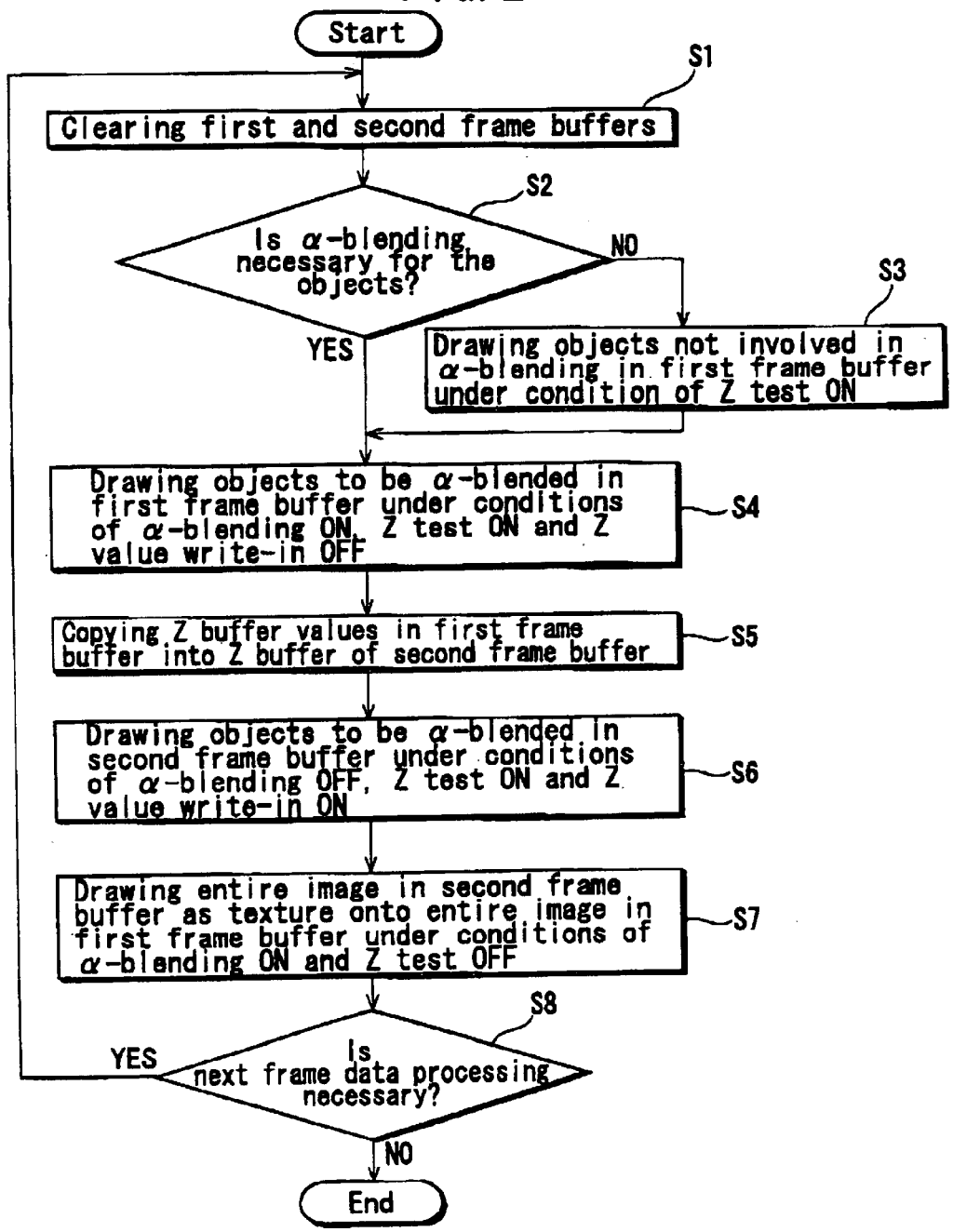
FIG. 2 is a flow chart showing a process for generating a two-dimensional image using two frame data storage areas in the image generation device according to the present embodiment.

In other words, the pixel engine 6 of the image generation device 1 of the present embodiment can generate unfailing two-dimensional image data by repeating the image drawing process two or three times using the first and second frame buffers 11, 12 while being combined with ON/OFF controls of the α-blending, Z test and Z value write-in operation, by performing the process shown in the flow chart of FIG. 2.

It should now be noted that in FIGS. 3 to 6 described below, reference numerals OB1 to OB4 represent objects differing from each other, and distances thereof from a viewpoint (Z coordinate value) increase in the order of OB1, OB2, OB3 and OB4. Objects OB1 and OB3 are those not to be α-blended, and objects OB2 and OB4 are those to be α-blended.

As shown in FIG. 2, the pixel engine 6, in a first step S1, clears the first and second frame buffers 11, 12 in the image memory 7 (first and second frame data storage areas), and then in step S2, determines for each object to be arranged within a frame whether it is to be α-blended.

Next in step S3, the pixel engine 6 subjects the objects for which it was previously determined in step S2 that α-blending is "not necessary", that is, the objects that are not to be α-blended, to the Z test and Z value write-in operation (Z test ON, and Z write-in operation ON), and then stores such objects into either of the two frame buffers 11 and 12, Here the first frame buffer 11 is used, for example (drawn in the frame buffer 11).

Of objects OB1 to OB4, those not to be α-blended are objects OB1 and OB3, where object OB3 is more distant from the viewpoint than object OB1. Since the Z value write-in operation is activated (in ON state) in step S3, Z values of the individual pixels are written in the Z buffer 8 to draw only pixels closer to the viewpoint while not retaining the distant pixels. That is, the RGB values and the α value of the pixels closest to the viewpoint are separately written in an RGB value storage area and an α value storage area of the first frame buffer 11.

Figure 3:
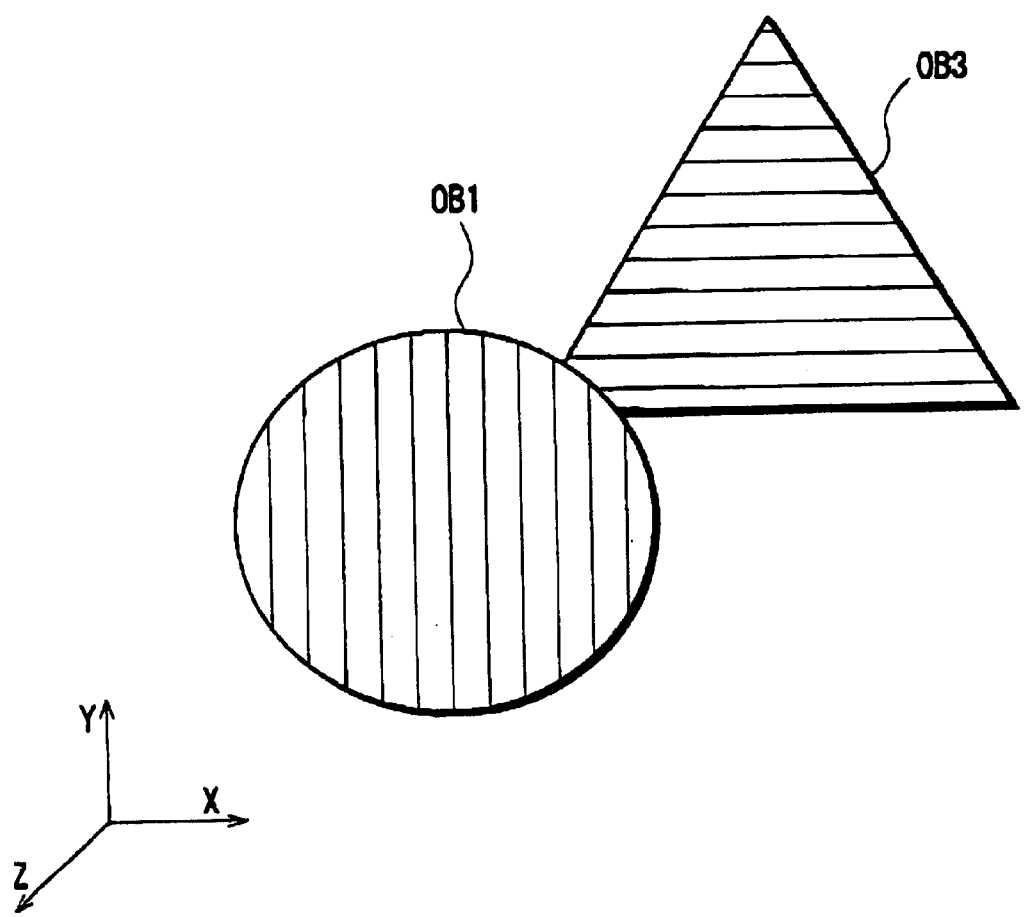
FIG. 3 is a schematic drawing showing an exemplary drawn image obtained in step S3 in the flow chart shown in FIG. 2.

Thus, a drawn image obtained in step S3, in which objects OB1 and OB3 are not α-blended under the conditions of the α-blending OFF, Z test ON and Z write-in operation ON, will appear as shown in FIG. 3, where the color or pattern of object OB3 which is more distant from the viewpoint is partially hidden behind object OB1 within a portion in which both objects overlap. Thus, such drawn image appears as a three-dimensional image in which object OB1 is seen in front of object OB3.

Note that the processing in step S3 will not be necessary when all objects in the frame are to be α-blended.

Next, the pixel engine 6 subjects the objects for which it was previously determined in step S2 that α-blending is "necessary", that is, the objects that are to be α-blended, to the processing in step S4 under conditions of α-blending ON, Z test ON and Z write-in operation OFF, and then overwrites such objects into the first frame buffer 11 similarly to step S3 (drawn in the frame buffer 11).

Of objects OB1 to OB4, those to be α-blended are objects OB2 and OB4. Objects OB1, OB2, OB3 and OB4 are located more distantly from the viewpoint in this order, and the processing in step S4 is performed under the conditions of α-blending ON, Z test ON and Z write-in operation OFF.

Figure 4:
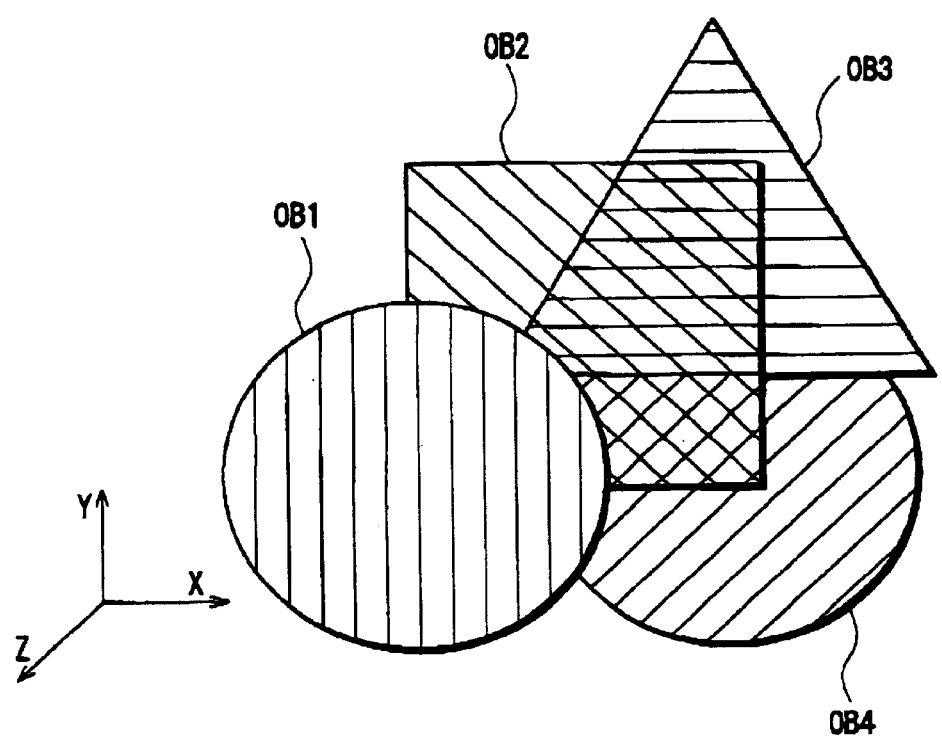
FIG. 4 is a schematic drawing showing an exemplary drawn image obtained in step S4 in the flow chart shown in FIG. 2.

Thus, a drawn image obtained in step S4, in which objects OB2 and OB4 are overwritten, under the conditions of α-blending ON, Z test ON and Z write-in operation OFF, onto the image previously drawn in the first frame buffer 11 in step S3, will appear as shown in FIG. 4. As is known from FIG. 4, the drawn image obtained in step S4 is correct in terms of the depth relationship between objects OB1 and OB3 drawn in step S3 under the condition of α-blending OFF, but is incorrect in terms of the depth relationship between objects OB2 and OB4 drawn in step S4 under the condition of α-blending ON, which makes the drawn image unnatural. In short, the drawn image should be such that objects OB1 to OB4 are aligned therein so that object OB1 comes foremost and objects OB2, OB3 and OB4 follow in this order so as to have a larger distance from the viewpoint. But in the drawn image at this point in time, the objects drawn in step S4 under the condition of α-blending ON do not follow the correct order given by the Z coordinate values. Nevertheless, areas where objects OB2 and OB4 are to be drawn are assigned with approximated colors or patterns.

Next in step S5, the pixel engine 6 copies the Z buffer values stored in the first frame buffer 11 to the Z buffer of the second frame buffer 12.

Next in step S6, the pixel engine 6 processes the objects to be α-blended under the conditions of α-blending OFF, Z test ON and Z write-in operation ON, and stores such processed objects in the second frame buffer 12 (drawn in the frame buffer 12).

Of objects OB1 to OB4, those to be α-blended are objects OB2 and OB4, where object OB4 is more distant than object OB2. In such processing in step S6, the conditions set for objects OB2 and OB4 are α-blending OFF, Z test ON and Z write-in operation ON.

Figure 5:
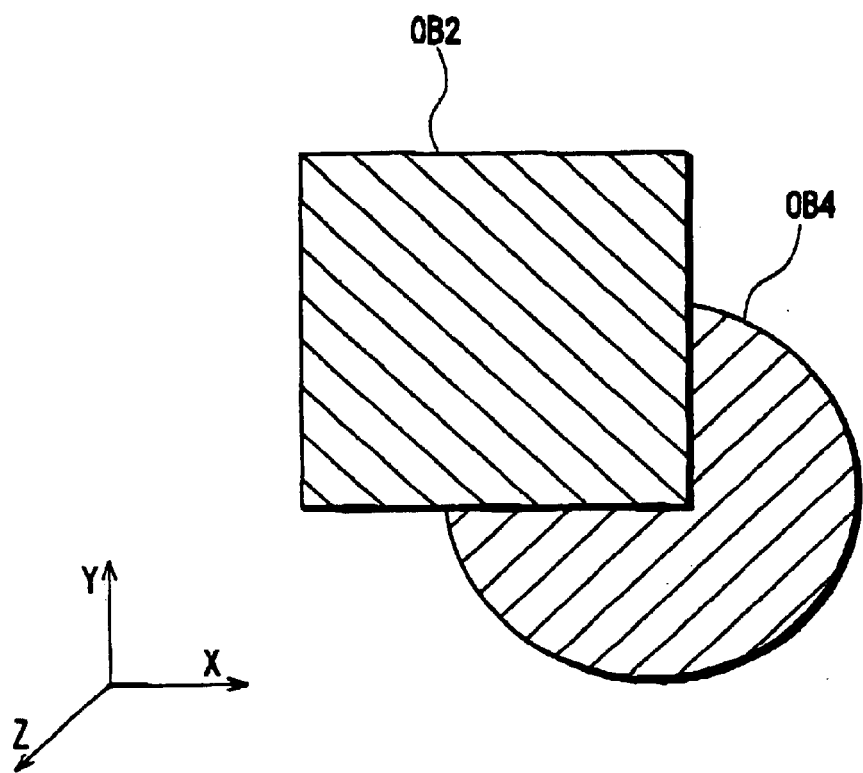
FIG. 5 is a schematic drawing showing an exemplary drawn image obtained in step S6 in the flow chart shown in FIG. 2.

Thus, the resultant drawn image is as shown in FIG. 5, in which the color or pattern of object OB4 which is more distant from the viewpoint is partially hidden by object OB2 within a portion in which both objects overlap. Since the Z value write-in operation is set ON in step S6, the Z values of the individual pixels are written in the Z buffer 8 to draw only the pixels closer to the viewpoint while not retaining the distant pixels. That is, the RGB values and the a value of the pixels closest to the viewpoint are separately written in an RGB value storage area and an α value storage area of the second frame buffer 12. Now the Z buffer 8 has stored therein the Z coordinate values previously used in step S3, which can directly be used for the Z test between the drawn image and the background image.

Next in step S7, the pixel engine 6 performs processing under the conditions of α-blending ON and Z test OFF for the entire image stored in the first frame buffer 11, using the entire image stored in the second frame buffer 12 as a texture, and the obtained image is stored in the first frame buffer 11 (drawn in the first frame buffer 11).

The drawn image, obtained in step S7 by processing the entire image in the first frame buffer 11 under the conditions of α-blending ON and Z test OFF, using the entire image stored in the second frame buffer 12 as a texture, ensures that the portions of the objects to be α-blended which are closest to the viewpoint are always α-blended last. In particular in α-blending, an object closest to the viewpoint can most significantly affect the quality of the image, so that drawing according to the present embodiment can provide an unfailing image.

Figure 6:
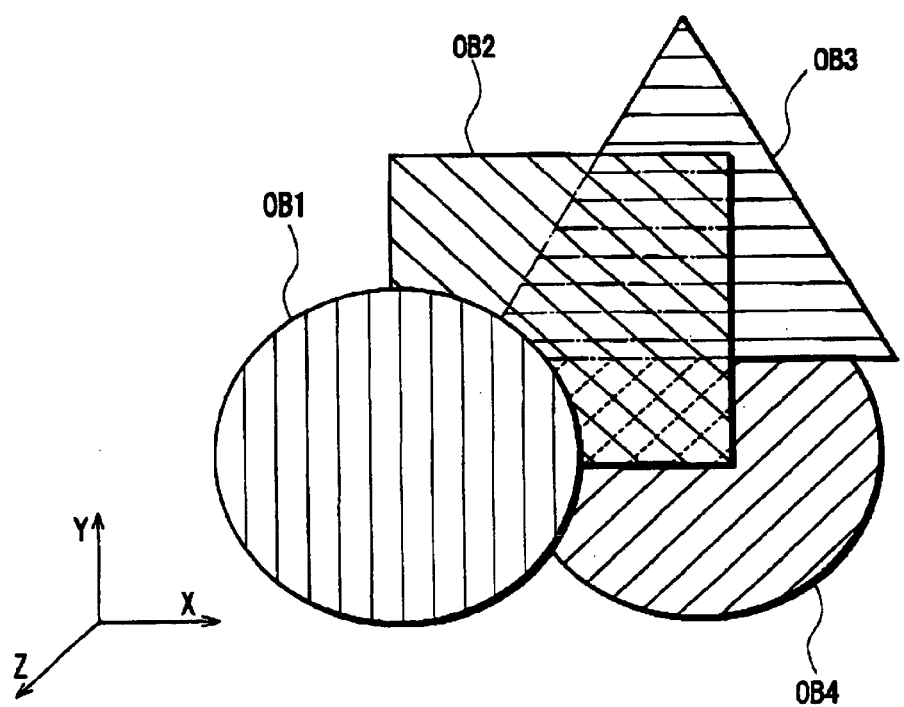
FIG. 6 is a schematic drawing showing an exemplary drawn image obtained in step S7 in the flow chart shown in FIG. 2.

That is, as shown in FIG. 6, the image obtained in the present embodiment is such that of objects OB2 and OB4 to be α-blended, object OB2 which comes foremost is always α-blended last. As a result, the image finally obtained is such as to apparently have object OB1 foremost, object OB2 of those objects to be α-blended next, object OB3 next, and object OB4 last. The dashed line and broken line in FIG. 6 express that the color or pattern of the behind objects in the overlapped portions of the objects can be seen in a semi-transparent manner by virtue of the α-blending.

Thereafter in step S8, the pixel engine 6 determines whether the draw processing is necessary for the next frame data, and returns to step S1 if necessary, and completes the processes shown in FIG. 2 if not.

In the pixel engine 6, the processes of the flow chart shown in FIG. 2 can also be accomplished on a hardware basis such as using a DSP, or on a software basis using a processing program downloaded through a communication network or using an image generation processing program read out by a storage device from a storage medium, which are executed by a CPU. In particular, when the processing in the pixel engine 6 is accomplished on a software basis, the image generation processing program will be such as to create within the storage area of the image memory 7 two frame data storage areas such as the foregoing first and second frame buffers 11 and 12, and then sequentially execute the processes of steps S1 to S8 previously explained referring to the flow chart of FIG. 2. Such image generation processing program may not only be provided previously as a processing program dedicated to the pixel engine 6, but also may be input together with, or prior to, the polygon information through the input terminal 13 in FIG. 1.

Figure 7:
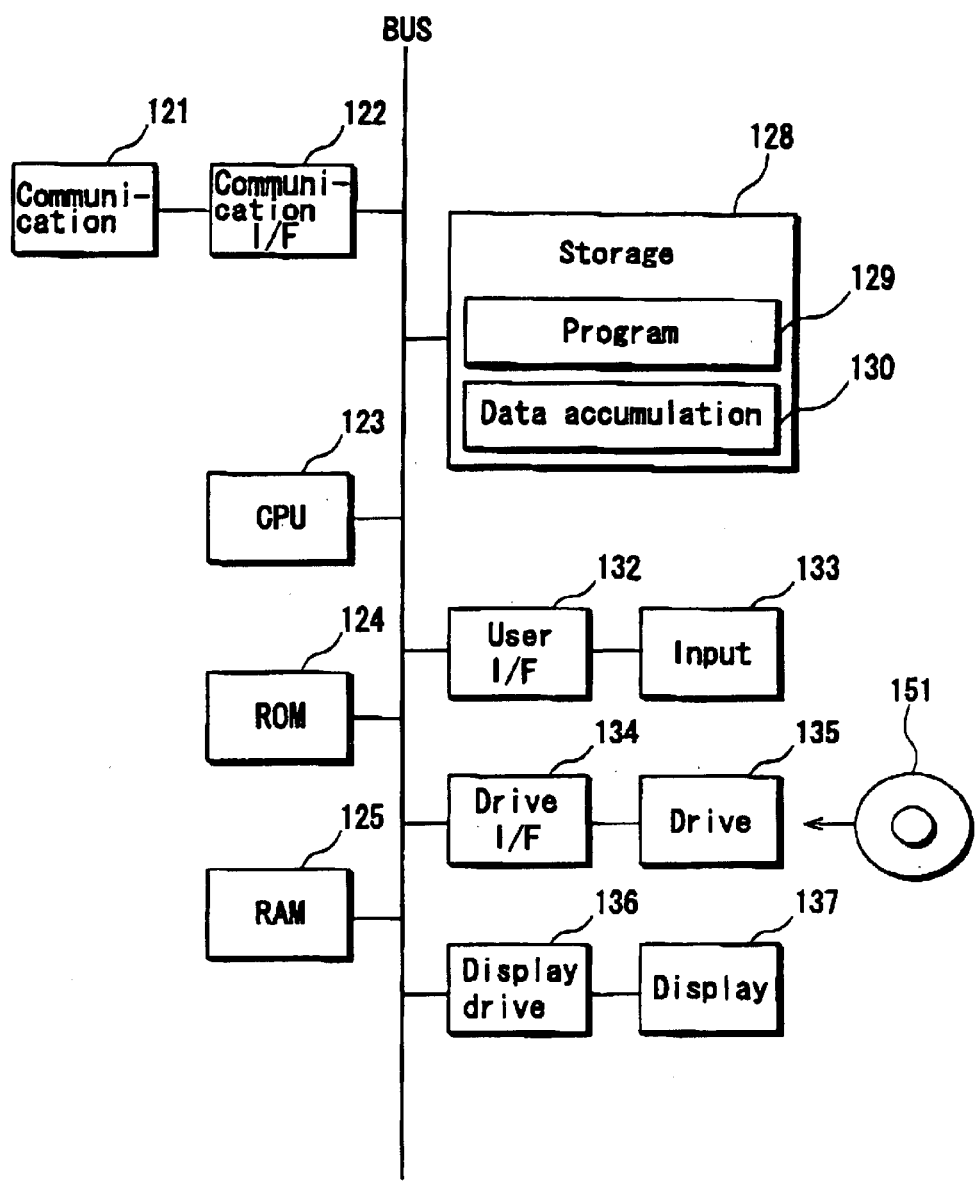
FIG. 7 is a block diagram explaining a personal computer for executing an image processing program whose process flow was shown by the flow chart in FIG. 2.

As one example for accomplishing the image generation processing of the present embodiment on a software basis, FIG. 7 shows a schematic configuration of a personal computer for executing the image processing program having the flow shown in FIG. 2. The image processing program of the embodiment is mainly executed by a CPU 123 shown in FIG. 7.

In FIG. 7, a storage section 128 typically comprises a hard disk and a drive therefor. Such hard disk has stored therein an operating system program, an image processing program 129 of the embodiment read out from one of various recoding media such as a CD-ROM or DVD-ROM, or downloaded through a communication line, and a variety of data 130 such as graphic information for polygon drawing, textures, Z values, general textures, color values and α values.

Communication section 121 refers to a communication device responsible for data communication with external devices, which may be a modem for establishing connection to an analog public telephone line, a cable modem for establishing connection to a cable television network, a terminal adaptor for establishing connection to an ISDN (integrated services digital network), or a modem for establishing connection to an ADSL (asymmetric digital subscriber line). Communication interface (I/F) section 122 refers to an interface device responsible for protocol transfer for enabling transmission/reception of data between the communication section 121 and an internal bus (BUS).

An input section 133 refers to an input device, such as a keyboard, mouse or touch pad, and user interface (I/F) section 132 refers to an interface device for supplying signals from such input section 133 to the internal devices.

Drive section 135 refers to a drive device capable of reading out various data or programs including the image processing program of the embodiment from a recording medium, including a disk medium 151, such as a CD-ROM or DVD-ROM, or from a card-type or other type of semiconductor memory. Drive interface (I/F) section 134 refers to an interface device for supplying signals from the drive section 135 to the internal devices.

Display section 137 refers to a display device such as a CRT (cathode ray tube) or liquid crystal display, and display drive section 136 is a drive device for driving the display section 137.

The ROM 124 typically comprises a rewritable non-volatile memory, such as a flash memory, which stores a BIOS (basic input/output system) and various default values. A RAM 125 will have loaded therein application programs and various data read out from a hard disk of the storage section 128, and is used as a work RAM of the CPU 123.

The CPU 123 controls the entire operation of the personal computer and executes the foregoing image generation processing based on the operating system program stored in the storage section 128 or the image processing program 129 of the present embodiment. That is, as shown in FIG. 7, the CPU 123 can accomplish the image generation processing as described in the above embodiment by executing the image processing program of the embodiment, which is one of the application programs read out from the hard disk of the storage section 128 and loaded into the RAM 125.

Summary of the Embodiment

In the present invention, object images to be subjected to predetermined image processing are subjected to such image processing and further to a predetermined comparison processing depending on assigned distances from a virtual viewpoint, and the compared object images are then drawn in a first frame image storage area without storing post-comparative assigned distances; the same object images are separately subjected to the predetermined comparison processing without subjecting them to the predetermined image processing. The compared object images are then drawn in a second frame image storage area while storing the post-comparative assigned distances. The frame images stored in the second frame image storage area are subjected to the predetermined image processing without being followed by the predetermined comparison processing, and such frame images are then synthesized with the frame images previously stored in the first frame image storage area, thereby ensuring that the portion of the object images closest to the virtual viewpoint is always subjected to the predetermined image processing last. The embodiment of the present invention also allows the processing to be simplified if there are no objects not to be α-blended.

More specifically, according to the embodiment of the present invention, the first and second frame buffers 11 and 12 are provided; and the pixel engine 6 executes, using such buffers, a series of processes in which the objects to be α-blended are processed under the conditions of α-blending ON, Z test ON and Z value write-in operation OFF, and the resultant objects are stored typically in the first frame buffer 11; the same objects are separately processed under the conditions of α-blending OFF, Z test ON and Z value write-in operation ON, and the resultant objects are stored in the second frame buffer; and the entire image stored in the second frame buffer 12 is drawn as a texture onto the entire image stored in the first frame buffer 11 under the conditions of α-blending ON and Z test OFF. This ensures that, of all objects to be α-blended, the foremost one which can most largely affect the image quality will always be α-blended last, which successfully provides an unfailing α-blended image without using the Z sorting.

According to the embodiment, unfailing drawing in which the correct depth relation of the objects is retained can be obtained, even if some of these objects are not involved in α-blending, which is accomplished by processing such not-involved objects under the conditions of Z test ON and Z value write-in operation ON, and drawing the resultant objects in the first frame buffer 11, and further drawing therein the objects to be α-blended after being processed under the conditions of α-blending ON, Z test ON and Z value write-in operation OFF.

The embodiment described in the above is only part of the examples of the present invention. It is therefore to be understood that the present invention may be practiced in any modifications depending on the design or the like otherwise than as specifically described herein without departing from the scope and the technical spirit thereof. For example, the number of frame image storage areas is by no means limited to two, and may be three or more. In the present invention, using a plurality of frame image storage areas to thereby distribute the processing will result in speeding up the image generation processing. In the present invention, three-dimensional α-blending is applicable not only to the foremost object, but also to the objects behind the foremost object having larger distances from the viewpoint.

What is claimed is:

1. An image generation method, comprising:
   providing initial object images each having a coefficient of semi-transparency and an assigned distance from a virtual viewpoint;
   subjecting ones of the initial object images to predetermined image processing to produce resultant object images;
   subjecting the resultant object images to predetermined comparison processing based on the assigned distances from the virtual viewpoint to produce compared object images;
   separately subjecting the ones of the initial object images to the predetermined comparison processing but not to the predetermined image processing to produce compared initial object images;
   subjecting the compared initial object images to the predetermined image processing to produce processed images; and
   combining the processed images with the compared object images to produce synthesized images.

2. The image generation method according to claim 1, wherein the predetermined image processing is a process for converting the ones of the initial object images into semi-transparent object images depending on the coefficients of semi-transparency of the initial object images.

3. An image generation method, comprising:
   providing a first frame image storage area and a second frame image storage area;
   providing initial object images each having a coefficient of semi-transparency and an assigned distance from a virtual viewpoint;
   subjecting ones of the initial object images to predetermined image processing to produce resultant object images;
   subjecting the resultant object images to predetermined comparison processing based on the assigned distances from the virtual viewpoint to produce compared object images, and drawing the compared object images in the first frame image storage area without storing assigned distances of the compared object images from the virtual viewpoint;
   separately subjecting the ones of the initial object images to the predetermined comparison processing but not to the predetermined image processing to produce compared initial object images, and drawing the compared initial object images in the second frame image storage area while storing assigned distances of the compared initial object images from the virtual viewpoint;
   subjecting the compared initial object images stored in the second frame image storage area to the predetermined image processing to produce processed images; and
   combining the processed images with the compared object images stored in the first frame image storage area to produce synthesized images.

4. The image generation method according to claim 3, wherein the predetermined comparison processing is a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

5. An image generation method, comprising:
   providing a first frame image storage area and a second frame image storage area;
   providing initial object images each having a coefficient of semi-transparency and an assigned distance from a virtual viewpoint, ones of the initial object images to be subjected to predetermined image processing;
   subjecting other ones of the initial object images not to be subjected to the predetermined image processing to predetermined comparison processing based on the assigned distances from the virtual viewpoint to produce first compared object images, and drawing the first compared object images in the first frame image storage area while storing assigned distances of the first compared object images from the virtual viewpoint;
   subjecting the ones of the initial object images to the predetermined image processing to produce resultant object images;
   subjecting the resultant object images to the predetermined comparison processing to produce second compared object images, and then combining in the first frame image storage area the second compared object images with the first compared object images to produce first frame images without storing assigned distances of the first frame images from the virtual viewpoint;
   separately subjecting the ones of the initial object images to the predetermined comparison processing but not to the predetermined image processing to produce compared initial object images, and then drawing the compared initial object images in the second frame image storage area while storing assigned distances of the compared initial object images from the virtual viewpoint;

subjecting the compared initial object images stored in the second frame image storage area to the predetermined image processing to produce processed images; and combining the processed images with the first frame images stored in the first frame image storage area to produce synthesized images.

6. The image generation method according to claim 5, wherein the predetermined comparison processing is a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

7. An image generation device, comprising:

an image processing unit operable to subject a first group of initial object images to predetermined image processing to produce resultant object images, the first group of initial object images each having a coefficient of semi-transparency and an assigned distance from a virtual viewpoint, to subject the resultant object images to predetermined comparison processing based on the assigned distances from the virtual viewpoint to produce compared object images, to separately subject the first group of the initial object images to the predetermined comparison processing but not to the predetermined image processing to produce compared initial object images, to subject the compared initial object images to the predetermined image processing to produce processed images, and to combine the processed images with the compared object images to produce synthesized images.

8. The image generation device according to claim 7, wherein the image processing unit performs, as the predetermined image processing, a process for converting the first group of initial object images into semi-transparent object images depending on the coefficients of semi-transparency of the first group of initial object images.

9. An image generation device, comprising:

a first frame image storage area and a second frame image storage area; and an image processing unit operable to (i) subject a first group of initial object images to predetermined image processing to produce resultant object images the first group of initial object images each having a coefficient of semi-transparency and an assigned distance from a virtual viewpoint;

(ii) subject the resultant object images to predetermined comparison processing based on the assigned distances from the virtual viewpoint to produce compared object images, and draw the compared object images in the first frame image storage area without storing assigned distances of the compared object images from the virtual viewpoint;

(iii) separately subject the first group of initial object images to the predetermined comparison processing but not to the predetermined image processing to produce compared initial object images, and draw the compared initial object images in the second frame image storage area while storing assigned distances of the compared initial object images from the virtual viewpoint;

(iv) subject the compared initial object images stored in the second frame image storage area to the predetermined image processing to produce processed images; and (v) combine the processed images with the compared object images stored in the first frame image storage area to produce synthesized images.

10. The image generation device according to claim 9, wherein the image processing unit performs, as the predetermined comparison processing, a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

11. An image generation device for processing initial object images each having a coefficient of semi-transparency and an assigned distance from a virtual viewpoint, ones of the initial object images to be subjected to predetermined image processing, the image generation device comprising:

a first frame image storage area and a second frame image storage area; and an image processing unit operable to (i) subject other ones of the initial object images not to be subjected to the predetermined image processing to predetermined comparison processing based on the assigned distances from the virtual viewpoint to produce first compared object images, and draw the first compared object images in the first frame image storage area while storing assigned distances of the first compared object images from the virtual viewpoint;

(ii) subject the ones of the initial object images to the predetermined image processing to produce resultant object images;

(iii) subject the resultant object images to the predetermined comparison processing to produce second compared object images, and then combine in the first frame image storage area the second compared object images with the first compared object images to produce first frame images without storing assigned distances of the first frame images from the virtual viewpoint;

(iv) separately subject the ones of the initial object images to the predetermined comparison processing but not to the predetermined image processing to produce compared initial object images, and draw the compared initial object images in the second frame image storage area while storing assigned distances of the compared initial object images from the virtual viewpoint;

(v) subject the compared initial object images stored in the second frame image storage area to the predetermined image processing to produce processed images; and (vi) combine the processed images with the first frame images stored in the first frame image storage area to produce synthesized images.

12. The image generation device according to claim 11, wherein the image processing unit performs, as the predetermined comparison processing, a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

13. A computer-readable recording medium having recorded thereon an image processing program to be executed on a computer, the image processing program for processing initial object images each having a coefficient of semi-transparency and an assigned distance from a virtual viewpoint, the image processing program comprising:

subjecting ones of the initial object images to predetermined image processing to produce resultant object images;

subjecting the resultant object images to predetermined comparison processing based on the assigned distances from the virtual viewpoint to produce compared object images;

separately subjecting the ones of the initial object images to the predetermined comparison processing but not to the predetermined image processing to produce compared initial object images;

subjecting the compared initial object images to the predetermined image processing to produce processed images; and combining the processed images with the compared object images to produce synthesized images.

14. The computer-readable recording medium according to claim 13, wherein the image processing program performs, as the predetermined image processing, a process for converting the ones of the initial object images into semi-transparent object images depending on the coefficients of semi-transparency of the initial object images.

15. A computer-readable recording medium having recorded thereon an image processing program to be executed on a computer, the image processing program utilizing a first frame image storage area and a second frame image storage area for processing initial object images each having a coefficient of semi-transparency and an assigned distance from a virtual viewpoint, the image processing program comprising:

subjecting ones of the initial object images to predetermined image processing to produce resultant object images;

subjecting the resultant object images to predetermined comparison processing based on the assigned distances from the virtual viewpoint to produce compared object images, and drawing the compared object images in the first frame image storage area without storing assigned distances of the compared object images from the virtual viewpoint;

separately subjecting the ones of the initial object images to the predetermined comparison processing but not to the predetermined image processing to produce compared initial object images, and drawing the compared initial object images in the second frame image storage area while storing assigned distances of the compared initial object images from the virtual viewpoint;

subjecting the compared initial object images stored in the second frame image storage area to the predetermined image processing to produce processed images; and combining the processed images with the compared object images stored in the first frame image storage area to produce synthesized images.

16. The computer-readable recording medium according to claim 15, wherein the image processing program performs, as the predetermined comparison processing, a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

17. A computer-readable recording medium having recorded thereon an image processing program to be executed on a computer, the image processing program utilizing a first frame image storage area and a second frame image storage area for processing initial object images each having a coefficient of semi-transparency and an assigned distance from a virtual viewpoint, ones of the initial object images to be subjected to predetermined image processing, the image processing program comprising:

subjecting other ones of the initial object images not to be subjected to the predetermined image processing to predetermined comparison processing based on the assigned distances from the virtual viewpoint to produce first compared object images, and drawing the first compared object images in the first frame image storage area while storing assigned distances of the first compared object images from the virtual viewpoint;

subjecting the ones of the initial object images to the predetermined image processing to produce resultant object images;

subjecting the resultant object images to the predetermined comparison processing to produce second compared object images, and then combining in the first frame image storage area the second compared object images with the first compared object images to produce first frame images without storing assigned distances of the first frame images from the virtual viewpoint;

separately subjecting the ones of the initial object images to the predetermined comparison processing but not to the predetermined image processing to produce compared initial object images, and then drawing the compared initial object images in the second frame image storage area while storing assigned distances of the compared initial object images from the virtual viewpoint;

subjecting the compared initial object images stored in the second frame image storage area to the predetermined image processing to produce processed images; and combining the processed images with the first frame images stored in the first frame image storage area to produce synthesized images.

18. The computer-readable recording medium according to claim 17, wherein the image processing program performs, as the predetermined comparison processing, a process for comparing Z coordinate values expressing the assigned distances from the virtual viewpoint of a first group of pixels composing the object images and a second group of pixels composing the object images, the pixels in the first group of pixels each having first X-Y coordinate values in a two-dimensional plane, and the pixels in the second group of pixels each having second X-Y coordinate values in the two-dimensional plane which are identical to the first X-Y coordinate values, for each X-Y coordinate value the predetermined comparison processing retaining only the pixel having a Z coordinate value closest to the virtual viewpoint, and omitting the pixel having a Z coordinate value which is not closest to the virtual viewpoint.

19. An image processing system for processing initial object images each having a coefficient of semi-transparency and an assigned distance from a virtual viewpoint, comprising:

a processor operable to execute instructions; and instructions, the instructions executable by said processor to subject ones of the initial object images to predetermined image processing to produce resultant object images; to subject the resultant object images to predetermined comparison processing based on the assigned distances from the virtual viewpoint to produce compared object images to separately subject the ones of the initial object images to the predetermined comparison processing but not to the predetermined image processing to produce compared initial object images to subject the compared initial object images to the predetermined image processing to produce processed images and to combine the processed images with the compared object images to produce synthesized images.

* * * * *

UNITED STATES PATENT AND TRADEMARK OFFICE
CERTIFICATE OF CORRECTION

PATENT NO. : 6,876,360 B2
DATED : April 5, 2005
INVENTOR(S) : Nobuo Sasaki

It is certified that error appears in the above-identified patent and that said Letters Patent is hereby corrected as shown below:

<u>Title page,</u>
Item [73], Assignee, "Assignee: Sony Corporation Entertainment Inc. (JP)" should read -- Assignee: Sony Computer Entertainment Inc. (JP) --

<u>Column 6,</u>
Line 51, "a value" should read -- $\alpha$ value --.

Signed and Sealed this

Fifth Day of July, 2005

JON W. DUDAS
*Director of the United States Patent and Trademark Office*